United States Patent [19]

Suzaki et al.

[11] Patent Number: 4,936,654
[45] Date of Patent: Jun. 26, 1990

[54] LIQUID CRYSTAL DISPLAY DEVICE

[75] Inventors: Takeshi Suzaki; Kenichi Narita, both of Tottori, Japan

[73] Assignees: Sanyo Electric Co., Ltd., Moriguchi; Tottori Sanyo Electric Co., Ltd., Tottori, both of Japan

[21] Appl. No.: 300,290

[22] Filed: Jan. 19, 1989

[30] Foreign Application Priority Data

Jan. 28, 1988 [JP] Japan ................................ 63-18000
Jun. 8, 1988 [JP] Japan ................................ 63-141293
Oct. 28, 1988 [JP] Japan ................................ 63-273824

[51] Int. Cl.$^5$ .............................................. G02F 1/13
[52] U.S. Cl. .................................. 350/337; 350/339 R; 350/347 E; 350/347 R
[58] Field of Search ............... 350/339 R, 334, 347 R, 350/347 V, 340, 341, 347 E, 337

[56] References Cited

U.S. PATENT DOCUMENTS

| | | | |
|---|---|---|---|
| 4,019,808 | 4/1977 | Scheffer | 350/347 R |
| 4,080,046 | 3/1978 | Nishizaki | 350/347 R |
| 4,232,948 | 11/1980 | Shanks | 350/347 R |
| 4,398,803 | 8/1983 | Pohl et al. | 350/334 |
| 4,443,065 | 4/1984 | Funada et al. | 350/335 |
| 4,544,583 | 10/1985 | Claussen et al. | 350/334 X |
| 4,579,425 | 4/1986 | Ishii et al. | 350/341 X |
| 4,652,088 | 3/1987 | Kando et al. | 350/334 |
| 4,693,562 | 9/1987 | Hasegawa et al. | 350/341 X |
| 4,697,884 | 10/1987 | Amstutz et al. | 350/346 X |
| 4,711,530 | 12/1987 | Nakanowatari et al. | 350/339 R |
| 4,767,190 | 8/1988 | Dir et al. | 350/334 X |
| 4,844,569 | 7/1989 | Wada et al. | 350/347 E |

FOREIGN PATENT DOCUMENTS

| | | | |
|---|---|---|---|
| 0131216 | 1/1985 | European Pat. Off. | |
| 0220221 | 9/1988 | Japan | 350/347 R |
| 0274925 | 11/1988 | Japan | 350/347 R |

*Primary Examiner*—Stanley D. Miller
*Assistant Examiner*—Anita Pellman Gross
*Attorney, Agent, or Firm*—W. G. Fasse; D. H. Kane, Jr.

[57] ABSTRACT

A liquid crystal display device has substrates opposed to each other, a nematic liquid crystal layer having a positive dielectric anisotropy and homogeneously oriented to have a twisted structure where liquid crystal molecules are twisted with a twist angle from 180° to 300°, the nematic liquid crystal layer being held between the substrates, polarizers between which the liquid crystal layer is placed, and a phase plate placed between the liquid crystal layer and one of the polarizers. In this display device, a product $\Delta n \cdot d(PH)$ of a birefringent anisotropy $\Delta n$ and a thickness d of the liquid crystal layer and a product $\Delta n \cdot d(PH)$ of a birefringent anisotropy $\Delta n$ and a thickness d of the phase plate satisfy a relational condition:

$$0.0 < \Delta n \cdot d(LC) - \Delta n \cdot d(PH) < 600 \text{ nm}.$$

19 Claims, 8 Drawing Sheets

FIG.1
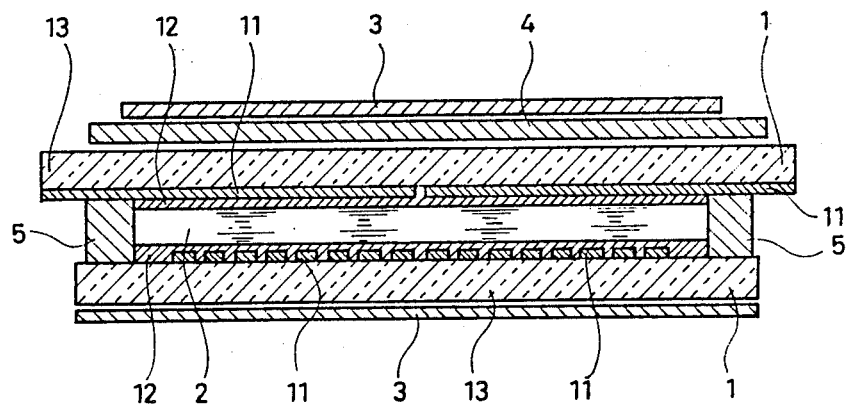
FIG.4A
FIG.4B
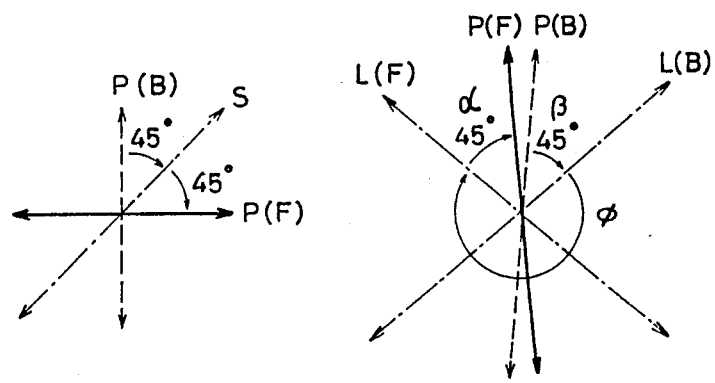

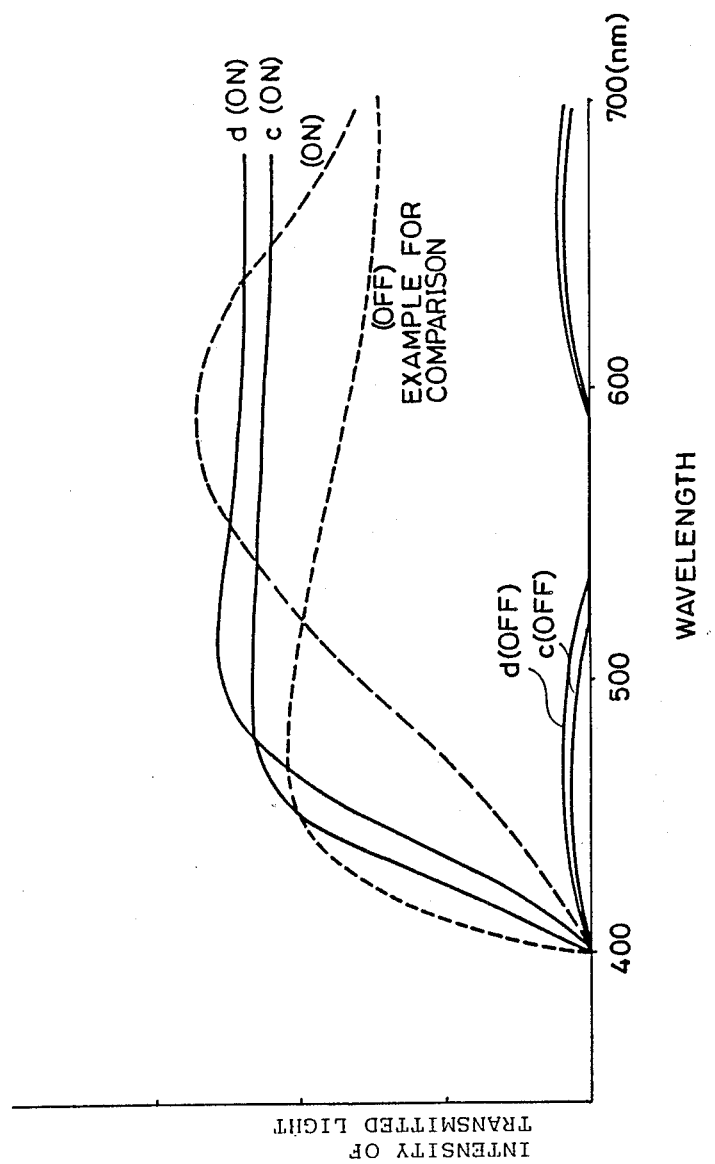

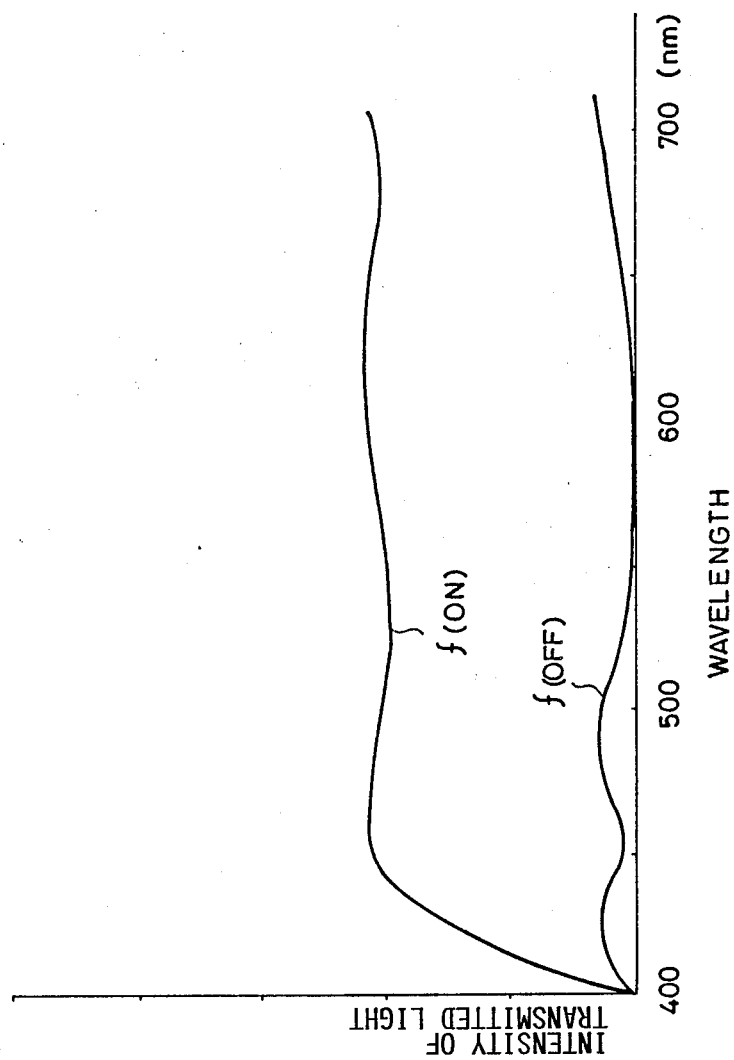

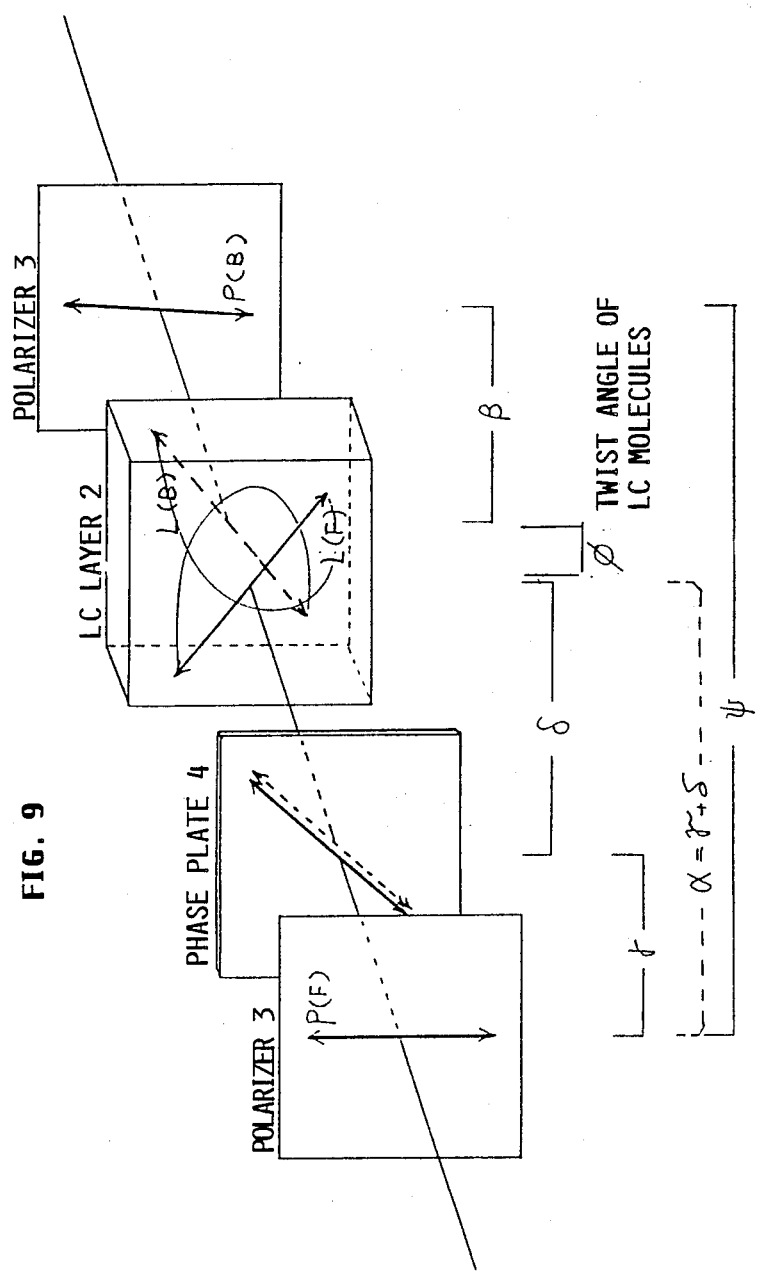

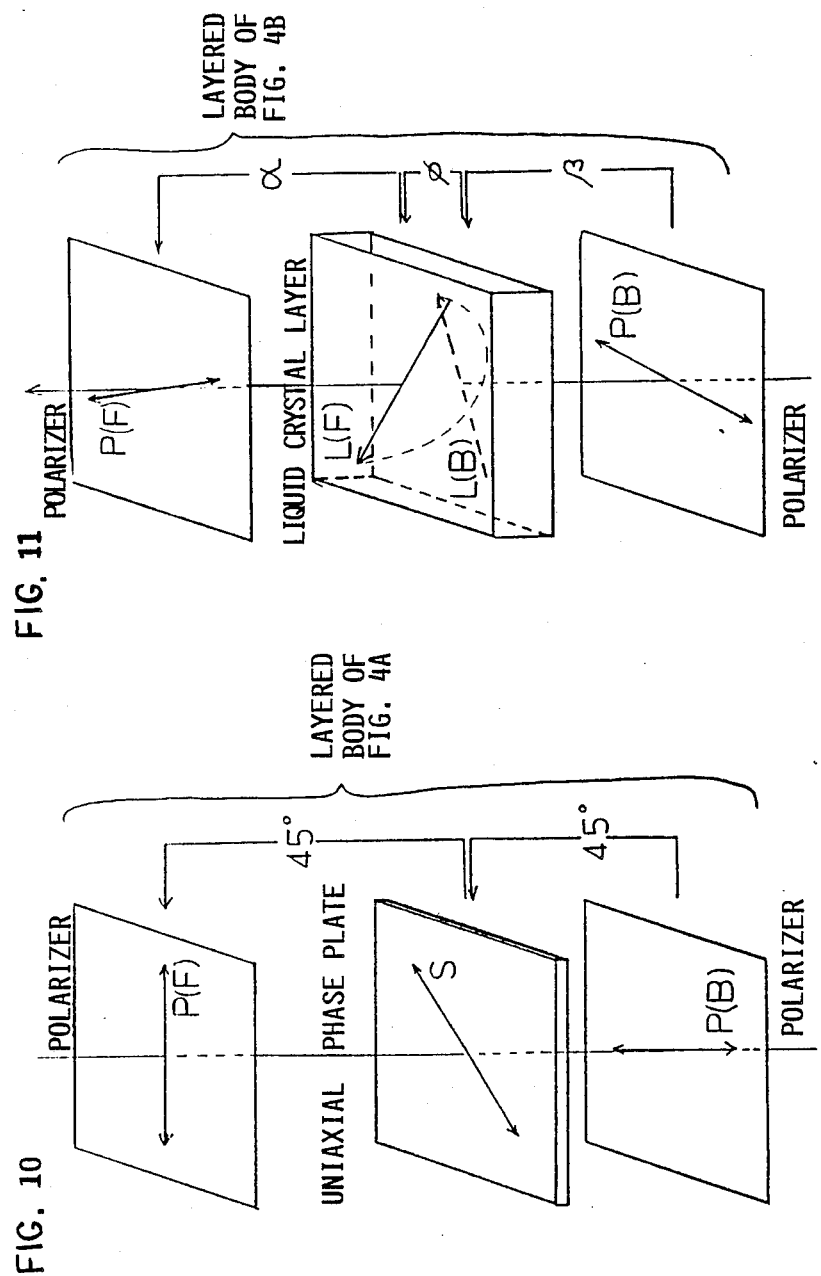

LIQUID CRYSTAL DISPLAY DEVICE

Field of the Invention

The present invention relates to liquid crystal display devices which are suitable for a high level multiplexing drive the display of which is easy to see.

BACKGROUND INFORMATION

A liquid crystal display device according to the present invention has a thin thickness and is capable of displaying a black-and-white image suitable for a high level multiplexing drive. Accordingly, it can be utilized as a large-area display device of a dot matrix type or as a display of a wordprocessor, a personal computer or the like. In addition, it can be also utilized as a color display in such a display device.

Recently, field-effect type liquid crystal display devices having a twisted structure of liquid crystal molecules have been developed, in which the liquid crystal molecules are oriented with a twist angle of 180° to 360° to provide a wide range of high contrast (namely, a wide visual range) and to enable a high level multiplexing drive. One of such liquid crystal display devices is disclosed for example in EPO-0131216A3. In such a liquid crystal display device, the display color appears bluish or yellowish due to birefringence of the liquid crystal. Therefore, liquid crystal display devices for high level multiplexing drive, capable of representing the so-called black-and-white display hve been developed. Among some methods used in such display devices, the method of providing two liquid crystal panels one upon another for phase compensation (disclosed for example in U.S. Pat. No. 4,443,065) is considered to be the one enabling the background hue (the background color) to be most close to white.

The principle of this method will be briefly described. The hue observed due to birefringence of a liquid crystal is an interference color, which appears because a beam is elliptically polarized in a liquid crystal layer. Consequently, an achromatic color can be obtained by twisting back the once twisted beam. For this purpose, a liquid crystal panel having the same characteristics as a liquid crystal panel used for driving, is placed on the liquid crystal panel, so as to be used for achromatization.

However, such liquid crystal panels have a large number of pixels because they are suited for a high level multiplexing drive, and accordingly have a large display area. In addition, the interference color depends also on the thickness of a liquid crystal layer and consequently, strict control is required for attaining evenness of the thicknes of the liquid crystal and stable characteristics. As a result, the manufacturing efficiency is lowered and the manufacturing cost are high. Further, the entire body of the display device becomes thick because two liquid crystal cells are placed one upon another, which unfavorably causes a deviation of a display position or a change in contrast due to parallax (dependent on the observing direction).

On the other hand, in order adjust hue in a liquid crystal display device, the method of using a ¼ wavelength plate (¼λ plate) or a phase plate is conventionally used (as disclosed for example in U.S. Pat. No. 4,232,948). However, although coloring and achromatization are simply regarded as being based on opposite theories, it is practically difficult to effect achromatization by circular polarization or using a ¼ wavelength plate. Particularly, it is difficult to adjust optical characteristics because of various factors such as a darkened display, a lowered contrast or appearance of other interference color and if the liquid crystal layer does not have stable characteristics over a wide area, the quality of display is further lowered.

SUMMARY OF THE INVENTION

Therefore, it is a primary object of the present invention to provide a liquid crystal display device which makes it possible to obtain a phase compensation for a color interference of the liquid crystal simply by placing a phase plate over a liquid crystal cell having a large twist angle of liquid crystal molecules.

According to the present invention, the retardation of a phase plate is adjusted based on the retardation of a liquid crystal layer, whereby the display device is suited for a high level multiplexing drive and can provide a so-called black-and-white display.

Another feature of the present invention is to provide a liquid crystal display device using an optically uniaxial plate of a thin thickness as a phase plate. Thus, it becomes easy to adjust an optical axis to maintain a high quality of display.

An uniaxially drawn sheet of resin is used as the above mentioned phase plate according to the present invention. Thus, the phase plate can be easily handled, making it possible to improve productivity, and a large-area display can be made.

In consequence, a display can be given as if black letters or images are printed on white paper, and the display has a high contrast. Since black/white reversal can be made in this display, a negative display and a positive display can be given.

In addition, since the whole body of the liquid crystal display device can be formed with a thin thickness, a deviation of a display position or a change in contrast due to parallax does not occur. Furhter, the display is achromatic and accordingly if a color filter is used, a color display can be made.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a sectional view of a liquid crystal display device according to an embodiment of the invention.

FIG. 2 is a graph showing display characteristics of a liquid crystal display device formed under conditions A according to the invention.

FIGS. 4A and 4B are illustrations ofoptical axes for explaining the principle of the present invention.

FIG. 6 is a graph showing display characteristics of a liquid crystal display device formed under conditions B according to the invention.

FIG. 9 is an exploded view of those elements of FIG. 1 needed for illustrating certain angular relationships.

FIG. 10 is an exploded view of the elements, the optical axes of which are shown in FIG. 4A.

FIG. 11 is an exploded view of the elements, the optical axes of which are shown in FIG. 4B.

DESCRIPTION OF THE PREFERRED EMBODIMENTS

Figure 3:
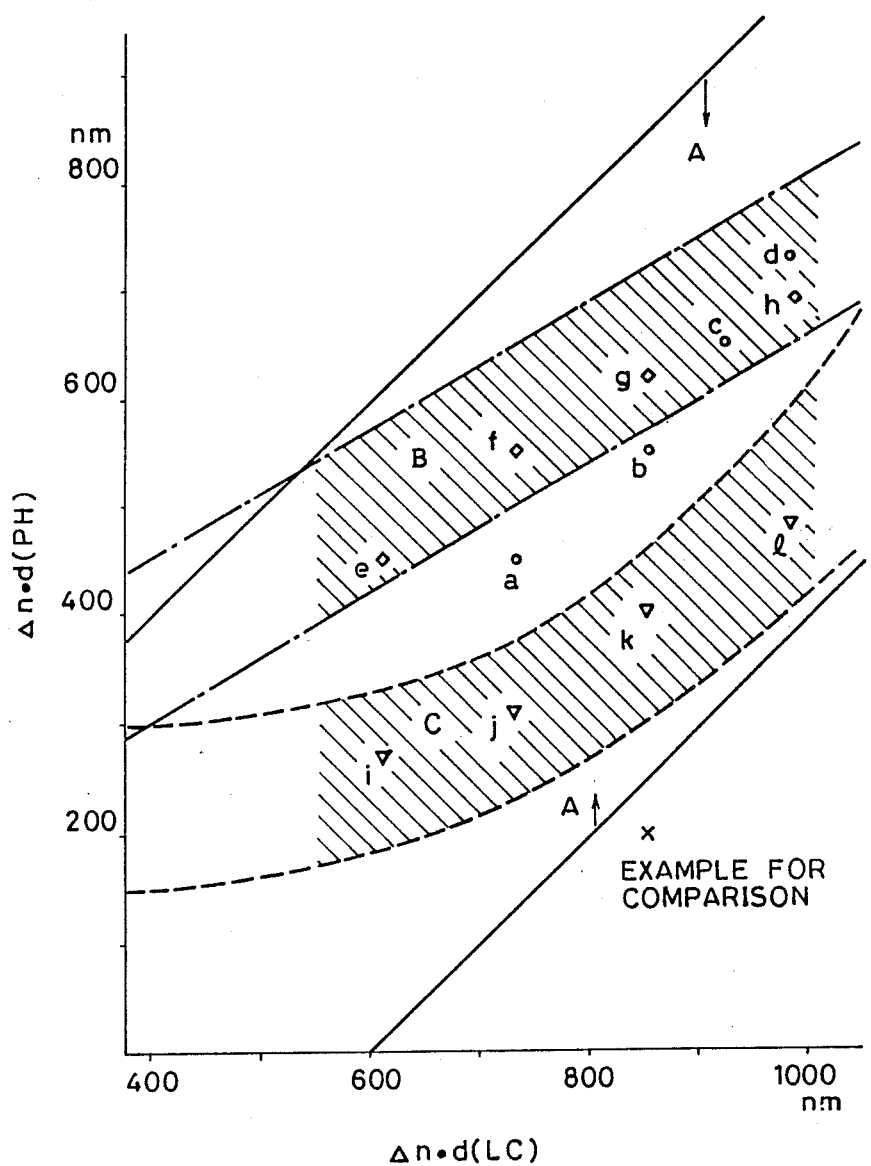
FIG. 3 is a characteristic diagram concerning birefringent anisotropy in a device of the invention.

A liquid crystal display device having a high contrast value and suited for a high level multiplexing drive having a large duty ratio, among currently utilized field-effect type liquid crystal display devices, has a structure in which two polarizers hold therebetween a chiral nematic liquid crystal layer having a positive dielectric anisotropy, namely, a liquid crystal layer having a twisted structured of liquid crystal molecules with a twist angle within the range of 180° to 300°.

FIG. 1 shows a sectional view of a liquid crystal display device according to an embodiment of the invention, where the above described structure is adopted. Substrates 1 are opposed to each other in this display device. Each substrate 1 includes a glass plate 13 having an inner surface on which transparent electrodes 11 and an orientation film 12 of liquid crystal molecules are provided. The transparent electrodes 11 on one substrate are located perpendicularly to those on the other substrate so as to provide a dot matrix display for exmaple. Each orientation film 12 has been processed to homogeneously orient the liquid crystal molecules. The substrates 1 are extending in parallel to each other, whereby sealing agents 5 provide a seal around the edges to form a container. A chiral nematic phase liquid crystal layer 2 having a positive dielectric anisotropy is interposed between the substrates 1 in the container. This liquid crystal layer 2 has a structure such that the liquid crystal molecules are twisted with a twist angle within the range of 180° to 300°. For example, layer 2 may be a 240° twist nematic layer. Two polarizers 3 are provided on respective outsides of the substrates 1. A phase plate 4 of resin is inserted between the upper substrate 1 and the upper polarizer 3.

This embodiment will be more specifically described in the following.

The liquid crystal layer 2 needs to satisfy, in principle, the same conditions as a super-twisted mode in the prior art in which liquid crystal molecules are twisted with a large angle by utilizing birefringence. However, as a result of detailed experiments it was found that the liquid crystal layer 2 exhibits more complicated optical characteristics by combination of the optical characteristics based on birefringence of liquid crystal molecules and rotary polarization of the twisted structure.

In the conventional method of twisting back elliptical polarization by laminating liquid crystal layers, it was not necessary to distinguish those optical characteristics. However, if a phase plate was to be used in place of one of the liquid crystal layers, it was necessary to adjust biaxial drawing characteristics and consequently it was necessary to analyze both of the birefringence and the rotary polarization, which involved considerable difficulties.

In view of those difficulties, experiments were carried out in the following manner. First, a liquid crystal layer of the super-twisted mode was placed between orthogonal nicol prisms or between two polarizers with their polarization axes being perpendicular to each other, and the product of the birefringent anisotropy $\Delta n$ and the thickness d of the liquid crystal layer, namely, a relation between retardation $\Delta n \cdot d$ (LC) and coloring was examined. Then, a phase plate was inserted between the orthogonal nicol prisms and the product of the birefringent anisotropy $\Delta n$ and the thickness d of the phase plate for attaining the same coloring, namely, the retardation $\Delta n \cdot d$ (PH) was examined. After that, the liquid crystal layer and the phase plate were laminated and presentation of color was investigated.

As the result of investigations as respresented in FIG. 3, it was found that the coloring phenomenon disappears in the transmitted visually observed light when the below indicated relation condition (A) is satisfied.

$$0.0 < \Delta n \cdot d(LC) - \Delta n \cdot d(PH) < 600 nm.$$

It was further found that regions of an enhanced contrast and a diminishing coloring exist dependent on a polarization axis or on orientation directions of the liquid crystal molecules. More specifically, in the case of an angle $\delta$ (counterclockwise) formed by the aligning direction of polymers of the phase plate with the orientation direction of liquid crystal molecules being substantially 90°, the phase plate and the liquid crystal layer are arranged with an angle $\gamma$ (counterclockwise) formed by the aligning direction of polymers of the phase plate 4 with the polarization axis or base line of the polarizer 3 adjacent to the phase plate 4 being in the range from 20° to 60°, an angle $\beta$ (counterclockwise) formed by the polarization axis or base line of the polarizer 3 not having the phase plate 4 with respect to the orientation direction of liquid crystal molecules adjacent thereto being in the range from 20° to 60° and an angle $\psi$ formed between the polarization axes of the two polarizers 3 being more than 0° and less than 30°. If said angles deviate from these limit values, interference colors of differnt wavelengths appear successively according to the degrees of deviation to cause lowering of the contrast and if said angles have deviated considerably from the limit values, the interference colors are deepened and a light intercepting effect occurs, making it difficult to visually observe the display. FIG. 9 illustrates the above mentioned angular relationships between the relevant components of FIG. 1.

In a preferred example of a display form, one of the polarizers is rotated by 90°, so that a reversal of a negative/positive display can be made. Accordingly, the angle $\psi$ can be defined by using, as a reference, the polarization axis or the absorption axis of the polarizer. In other words, the angle $\psi$ is defined either between the axes of the polarizers 3 as mentioned above, or it is defined between the polarization axis of one polarizer 3 and the absorption axis of the othe polarizer 3.

Table 1 shown below illustrates typical examples of the results of the above mentioned examinations.

TABLE 1

| lot | a | b | c | d |
|---|---|---|---|---|
| mode | positive | positive | negative | negative |
| $\beta$ | 25° | 25° | 35° | 55° |
| $\gamma$ | 25° | 30° | 40° | 55° |
| $\delta$ | 80° | 80° | 90° | 90° |
| $\psi$ | 15° | 15° | 15° | 10° |
| $\Delta n \cdot d(LC)$ | 730 nm | 850 nm | 920 nm | 980 nm |
| $\Delta n \cdot d(PH)$ | 450 nm | 550 nm | 650 nm | 730 nm |
| contrast | 12 | 13 | 35 | 40 |

FIG. 2 shows typical display characteristics of the lots d and c and FIG. 3 shows relations of retardation.

For comparison, an undesirable example of conditions is indicated below.

$$\beta = \gamma = 45°$$

$$\Delta n \cdot d(PH) = 200 \text{ nm}$$

$$\Delta n \cdot d(LC) = 850 \text{ nm}$$

CONTRAST 1.0

The above described phase plate 4 can be formed by laminating a sheet or a plurality of sheets of uniaxially drawn polymeric resin material such as ployvinyl butyrol, polyvinyl alcohol, polyester, cellulose acetate, cellulose butyrate, polypropylene, or polycarbonate.

If setting of each optical axis deviates in the above described liquid crystal display device, the contrast or the coloring is adversely affected. If the value $\Delta n \cdot d(LC)$ becomes small, the display becomes darkened to present a light blue color and the contrast is lowered. On the other hand, if it becomes large, the display presents a yellowish color and if it is further increased, the hue wavelength of an interference color caused by birefringence deviates and finally a high-order interference occurs.

In order to prevent such phenomena, investigations were made as to the conditions that would provide a high contrast and good reproducibility of a base color for which an interference color of a liquid crystal layer can be easily compensated. Thus, an experiment was carried out based on the previously mentioned experimental results, in which a liquid crystal layer having a retardation $\Delta n \cdot d(LC)$ for making it possible to obtain in a pratical contrast in the super-twisted mode, was formed to approximate an optically uniaxial substance body.

A more detailed description of these experiments will be made with reference to FIG. 4. If an uniaxial substance is held between orthogonal nicol prisms, the intensity of light visually observed through the laminate body, namely, the brightness of light is expressed by the following equation.

$$I = I_0 \sin^2(2\theta) \sin^2\{(\pi/\lambda)\Delta n d\}$$

wherein
I is the intensity of transmitted light,
$I_0$ is the intensity of incident light,
$\theta$ is an angle formed between the optical axis of the optical uniaxial substance and one of the polarization axes,
$\lambda$ is the wavelength of the light used for the observation,
$\Delta n$ is the birefringent anisotropy of the optical uniaxial substance, and
d is the thickness of the optical uniaxial substance.

A change in brightness in the case of observation with a single-color beam depends only on $\theta$ based on the above indicated equation. Thus, reversal of the brightness and darkness is repeated four times while the optical uniaxial substance is rotated by 360°. However, if the observation is made with a white beam or a beam of a similar color, $\sin^2\{(\pi/\lambda)\Delta n d\}$ is changed dependent on the wavelength $\lambda$ and the transmitted light intensity I causes a wavelength dependency. In order to obtain the maximum contrast of the optical uniaxial substance, the polarization axis (P) of the polarizer and the optical axis (S) of the optical uniaxial substance are caused to deviate by 45° as shown in FIG. 4A, which condition satisfies the above indicated equation. In FIG. 4, F and B represent a front side and a back side of the device, respectively.

However, in the case of a liquid crystal layer, rotary polarization occurred because liquid crystal molecules had a twisted structure (with a twist angle $\phi$) and the optical axis rotates according to the twist and the above indicated equation was not exactly satisifed. Therefore, another investigation was carried out as to a spectrum of transmitted light in a liquid crystal display device in the super-twisted mode, in a manner of setting to 45° the angle $\beta$ formed by the polarization axis of one polarizer with respect to the orientation direction of the liquid crystal molecules adjacent to the polarizer and rotating the other polarizer. As a result, it was found that there are two angles presenting transmitted light intensity characteristics corresponding to the above indicated equation, in the visible radiation range. Further, it was found that the angle $\alpha$ formed between the polarization axis (P) of the rotating polarizer and the axis (L) of liquid crystal molecules adjacent thereto, assumes two values of about 45° and 135° in the same direction as the twisted direction of liquid crystal molecules from the liquid crystal molecule axis as the base line. This condition is schematically shown in FIG. 4B. Accordingly, it can be said that the conditions of FIGS. 4A and 4B are substantially equal.

The above described characteristics are the optical characteristics taking account only of the rotary polarization caused by the twisted structure and based on these characteristics, the optical characteristics of the base phase plate are adjusted so that the laminated body of the liquid crystal layer and the phase plate may be an optically uniaxial substance.

Based on the foregoing, one can conclude empirically, that a light phase length of light transmitted through the phase plate and a light path length of light transmitted through the liquid crystal layer, become substantially equal in a liquid crystal display device having liquid crystal molecules of a twist angle of 180° to 300°, if the retardation of the liquid crystal layer $\Delta n \cdot d(LC)$ and the retardation of the phase plate $\Delta n \cdot D(PH)$ satisfy the relation condition (B):

$$0.6 \ \Delta n \cdot d(LC) + 60 \text{ nm}$$
$$< \Delta n \cdot d(PH)$$
$$< 0.6 \ X\Delta n \cdot d(LC) + 210 \text{ nm}$$

Figure 5:
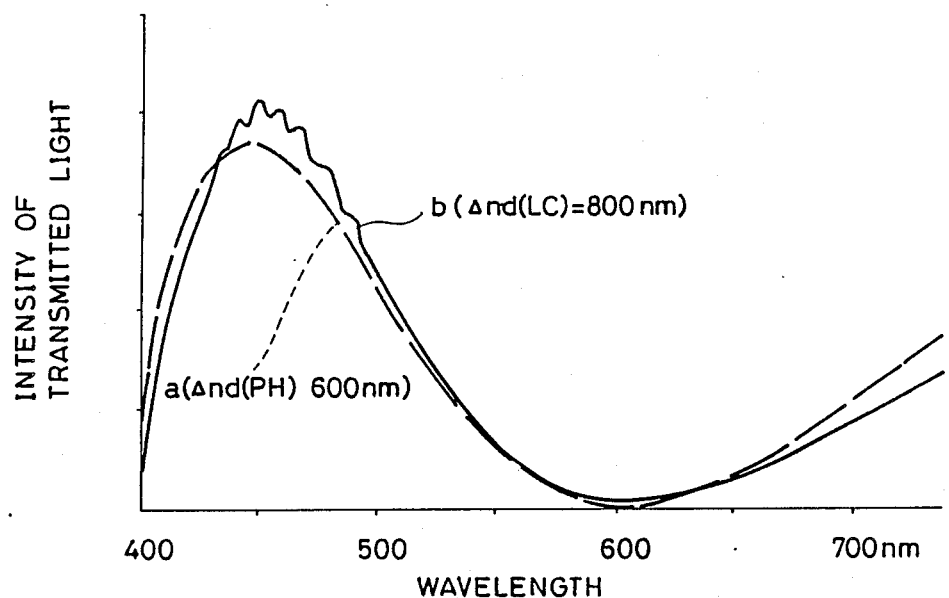
FIG. 5 is a graph showing a transmission spectrum of an optical laminate body formed under conditions B.

For example, the spectrum of light transmitted through the layered body of FIG. 10 with a phase plate of the above mentioned uniaxial substance of $\Delta n \cdot d(PH)$ of 600 nm, and the spectrum of light transmitted through the layered body of FIG. 11 using a liquid crystal cell in the super-twisted mode having $\Delta n \cdot d(LC)$ of 800 nm, are substantially equal to each other as shown by a and b in FIG. 5. The angular relationships for FIG. 10 are shown in FIG. 4A. The angular relationships for FIG. 11 are shown in FIG. 4B. Accordingly, if a phase plate which satisfies the above indicated relation condition (B) is laminated to the liquid crystal cell in a compensating manner, the phase difference in transmitted light becomes zero and a so-called black-and-white negative display with no birefringent interference color can be obtained.

In addition, if one of the polarizers is rotated by 90° in that condition, a positive display can be obtained.

Typical examples based on the above described conditions are shown in Table 2.

In addition, FIG. 3 shows the relations of the retardations in Table 2. Referring to FIG. 3, a hatched area indicated by B is a region satisfying the condition (B). Further, FIG. 6 shows a characteristic diagram of the lots of Tabel 2, in which a multiplexing drive is carried out with a 1/200 duty cycle.

TABLE 2

| lot | e | f | g | h |
|---|---|---|---|---|
| mode | positive | positive | positive | positive |
| $\beta$ | 45° | 45° | 45° | 45° |
| $\gamma$ | 45° | 45° | 45° | 45° |
| $\delta$ | 90° | 90° | 100° | 100° |
| $\psi$ | 240° | 240° | 240° | 240° |
| $\Delta n \cdot d(LC)$ | 610 nm | 730 nm | 850 nm | 980 nm |
| $\Delta n \cdot d(PH)$ | 450 nm | 550 nm | 620 nm | 690 nm |
| contrast | 16 | 21 | 30 | 25 |

In the above described preferred embodiment, a high contrast was exhibited when the angle $\delta$ formed between the optical axial direction fo the phase plate and the orientation direction of liquid crystal molecules adjacent to the phase plate was in the range of 70° to 110° and the angel $\beta$ formed between the polarization axis of the polarizer and the orientation direction of liquid crystal molecules adjacent thereto was in the range of 30° to 60°. In addition, in order to correct unevenness of the adjustment of retardation $\Delta n \cdot d(LC)$ of the liquid crystal or to correct the temperature dependency, the angle $\delta$ should be changed to a larger or smaller value than 90°.

However, the relational expression (B) is based on a negative display and the value $\Delta n \cdot d(PH)$ which satisfies this relational expression is as large as about 600 nm. In general, in the case of a negative display, a high contrast enables the display to be easy to see, while in the case of a positive display, a high contrast does not have a direct relation with an easy to see display i.e., a display which can be easily determined and does not fatigue the eyes. In addition, if the value $\Delta n \cdot d(PH)$ becomes large, unevenness of drawing and unevenness of thickness are more likely to occur and it becomes more difficult to maintain the uniformity of the optical characteristics.

In view of the above mentioned difficulties, the use of a phase plae was investigated having a smaller difference in the light path by only about ½ wavelength of the visible radiation range than the difference in light path of a liquid cyrstal cell, based on the above described principles and calculations were carried out to obtain an experimental expression for rendering a display achromatic.

As a result, the below indicated relational expression (C) was obtained.

$$(7.5 \times 10^{-4})(\Delta n \cdot d(LC) - 400\text{nm})^2 + 150\text{nm} <$$

$$\Delta n \cdot d(PH) <$$

$$(7.5 \times 10^{-4})(\Delta n \cdot d(LC) - 400\text{nm})^2 + 300\text{nm}$$

Since this relational expression has a wavelength dependency, a quadratic fucntion is obtained and since the black and white conception is reversed, a positive display is given as a basic display.

Figure 7:
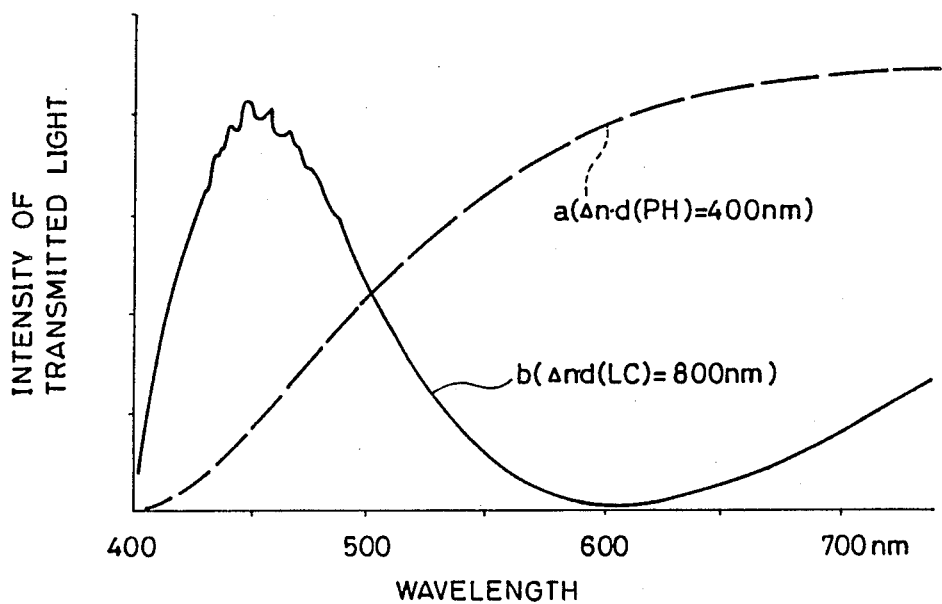
FIG. 7 is a graph showing a transmission spectrum of an optical laminate body formed under conditions C.

For example, the spectrum transmitted through the laminated body of FIG. 4A using a phase plate of $\Delta n \cdot d(PH)$ of 400 nm and that transmitted through the laminated body of FIG. 4B using a liquid crystal cell of $\Delta n \cdot d(LC)$ of 800 nm are shown by curves a and b in FIG. 7. Accordingly, if a phase plate which satisfies the above indicated relational expression (C), is laminated to the opposed liquid cyrstal cell in a compensating manner, a phase difference of the transmitted light becomes $\pi$ in the visible radiation range and the so-called black-and-white positive display can be represented without any birefringent interference color. in addition, if one of the polarizers is rotated by 90° in that condition, a negative display can be obtained.

Figure 8:
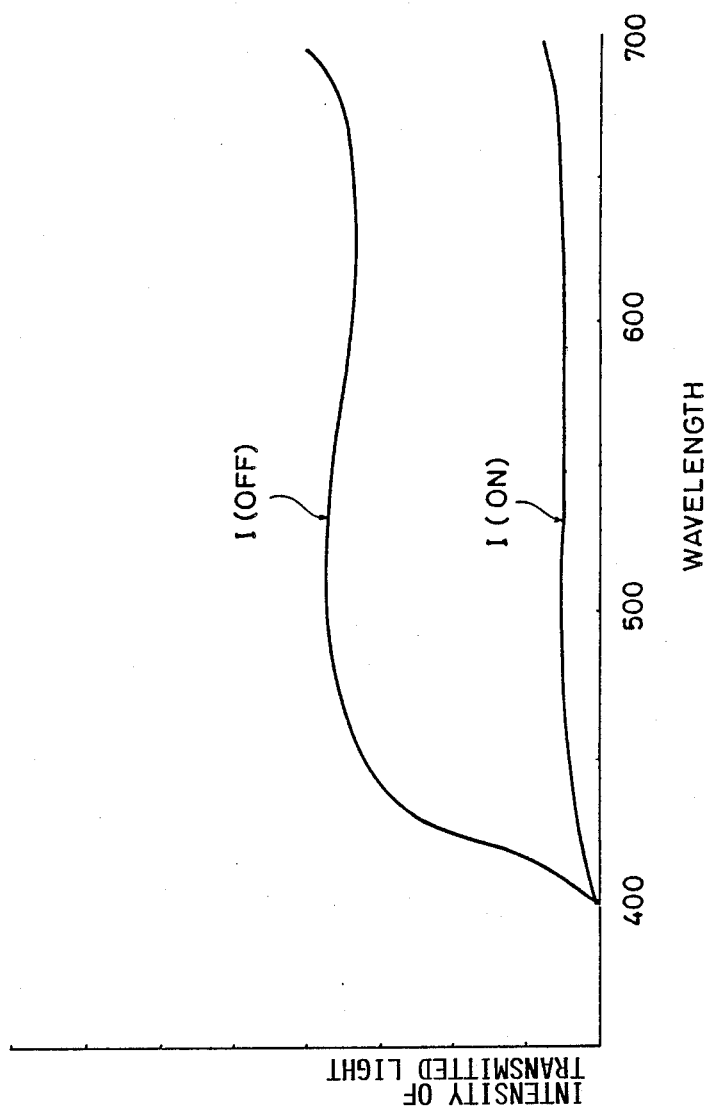
FIG. 8 is a graph showing display characteristics of a liquid crystal display device formed under conditions C according to the invention.

A typical embodiment based on the above described conditions is shown in Table 3 shown below and the relations of these conditions are indicated again in FIG. 3. In FIG. 3, a hatched area indicated by C is an area satisfying the relational expression (C). In addition, FIG. 8 shows a characteristic diagram in the case of a 1/200 duty cycle multiplexing drive in display devices of the lots shown in Table 3.

TABLE 3

| lot | i | j | k | l |
|---|---|---|---|---|
| mode | positive | negative | positive | negative |
| $\beta$ | 45° | 45° | 45° | 45° |
| $\gamma$ | 45° | 45° | 45° | 45° |
| $\delta$ | 100° | 90° | 90° | 100° |
| $\phi$ | 240° | 240° | 240° | 240° |
| $\Delta n \cdot d(LC)$ | 610 nm | 730 nm | 850 nm | 980 nm |
| $\Delta n \cdot d(PH)$ | 270 nm | 310 nm | 400 nm | 480 nm |
| contrast | 21 | 17 | 24 | 28 |

If the value $\Delta n \cdot d(LC)$ becomes small, the display becomes darkened and a lower contrast is observed. On the other hand, if it becomes large, the hue wavelength of a birefringent interference color is caused to deviate and finally a high-order interference occurs.

The conditions for providing a good contrast and presenting a base color for which an interference color of a liquid crystal layer can be easily compensated, are as follows. The nematic liquid crystal layer has a thickness of less than 10 μm and it has a twisted structure with a twist angle within the range of 180° to 300° where the product $\Delta n \cdot d(LC)$ of the birefringent anisotropy $\Delta n$ and the thickness d is in the range from 600 to 900 nm and, a phase plate of resin having the value $\Delta n \cdot d(PH)$ of preferably 250 to 800 nm is inserted between the liquid crystal layer and the polarizer. Thus, a display device which represents an achromatic background can be manufactured with a good productivity. In addition, a plurality of such phase plates may be provided to sandwich the liquid crystal layer.

As described in the foregoing, the present invention makes it possible to give a display with a non-colored beam, which enables the display of white color for the background and a black color obtained by interception of the beam, in a manner in which a beam applied through a birefringent rotary polarization in a liquid crystal panel, is compensated as an optical uniaxial substance. Thus, a display with a high quality can be represented as if black images are printed on white paper, and thus a high contrast is obtained. Since this display can be reversed from black to white or vice verse, both a negative display and a positive display can be made. In addition, since the display is achromatic, a color display can be given by using a color filter.

Since only one liquid crystal panel is used and the phase plate can be manufactured by molding, the display device can be manufactured with a good productivity at low cost and it can be made to have a large display area.

Furthermore, since the entire body of the liquid crystal display device can be made thin, deviation in a display position or change in contrast due to parallax does not occur.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid cyrstal display device comprising: substrates opposed to each other, a chiral nematic liquid crystal layer homogeneously oriented with respect to said substrates, said liquid crystal layer causing a birefringence, polarizers arranged with a spacing from each other, said liquid cyrstal layer being positioned in said spacing, and a uniaxial phase plate inserted between said liquid crystal layer and one of said polarizers, wherein a first product $\Delta n \cdot d(LC)$ of a birefringent anisotropy $\Delta n$ and a thickness d of said liquid cyrstal layer and a second product $\Delta n \cdot d(PH)$ of a birefringent anisotropy $\Delta n$ and a thickness d of said phase plate satisfy a relational condition:

$$0.0 < \Delta n \cdot d(LC) - \Delta n \cdot d(PH) < 600 \text{ nm};$$

whereby said birefringence is compensated.

2. The liquid crystal display device in accordance with claim 1, wherein
said phase plate is an uniaxially drawn resin sheet and the drawing direction has an angle within the range of 20° to 60° with a polarizing axis or an absorption axis of the polarizer adjacent thereto and a polarization axis of the related polarizer has an angle within the range of 20° to 60° with respect to the orientation direction of liquid crystal molecules adjacent to said polarizer.

3. The liquid crystal display device in accordance with claim 1, wherein said first and second products satisfy the following further relational conditions:

$$0.6 \, \Delta n \cdot d(LC) + 60 < \Delta n \cdot d(PH) < 0.6 \, \Delta n \cdot d(LC) + 210 \text{ nm}$$

with respect to $\Delta n \cdot d(LC) \geq 550$ nm, for an improved contrast.

4. The liquid crystal display device in accordance with claim 3, wherein
said display device is constructed for providing a negative display.

5. The liquid crystal display device in accordance with claim 3, wherein
said liquid crystal layer has a thickness less than 10 $\mu$m.

6. The liquid crystal display device in accordance with claim 3, wherein
said phase plate is an uniaxially drawn resin sheet.

7. The liquid crystal display device in accordance with claim 3, wherein said phase plate is an uniaxially drawn resin sheet and the drawing direction has an angle from 20° to 60° with a polarizing axis or an absorption axis of the polarizer adjacent thereto and is substantially perpendicular to the orientation direction of liquid crystal molecules adjacent to said phase plate.

8. The liquid crystal display device in accordance with claim 3, wherein said phase plate is optical uniaxially and an optical axis thereof has an angel from 70° to 110° with respect to the orientation direction of liquid crystal molecules adjacent to said phase plate and a polarization axis of the related polarizer has an angle from 30° to 60° with respect to the orientation direction of liquid crystal molecules adjacent to said polarizer.

9. The liquid crystal display device in accordance with claim 1, wherein said first and second products satisfy the following further relational conditions:

$$(7.5 \times 10^{-4})(\Delta n \cdot d(LC) - 400 \text{ nm})^2 + 150 \text{ nm} < \Delta n \cdot d(PH) < (7.5 \times 10^{-4})(\Delta n \cdot d(LC) - 400 \text{ nm})^2 + 300 \text{ nm}$$

with respect to $\Delta n \cdot d(LC) \geq 550$ nm, for an improved contrast.

10. The liquid crystal display device in accordance with claim 9, wherein
said display device is constructed for providing a positive display.

11. The liquid crystal display device in accordance with claim 9, wherein
said liquid crystal layer has a thickness less than 10 $\mu$m.

12. The liquid crystal display device in accordance with claim 9, wherein
said phase plate is an uniaxially drawn resin sheet.

13. The liquid crystal display device in accordance with claim 9, wherein
said phase plate is an uniaxially drawn resin sheet and the drawing direction has an angle from 20° to 60° with a polarizing axis or an absorption axis of the polarizer adjacent thereto and is substantially perpendicular to the orientation direction of liquid crystal molecules adjacent to said phase plate.

14. The liquid crystal display device in accordance with claim 9, wherein
said phase plate is optical uniaxially and an optical axis thereof has an angle from 70° to 110° with respect to the orientation direction of liquid crystal molecules adjacent to said phase plate and a polarization axis of the related polarizer has an angle from 30° to 60° with respect to the orientation direction of liquid crystal molecules adjacent to said polarizer.

15. The liquid crystal display device in accordance with claim 1, wherein
said liquid crystal layer has a thickness less than 10 $\mu$m.

16. The liquid crystal display device in accordance with claim 1, wherein
said phase plate is an uniaxially drawn resin sheet.

17. The liquid crystal display device in accordancde with claim 1, wherein
said phase plate is an uniaxially drawn resin sheet and the drawing direction has an angle from 20° to 60° with a polarizing axis or an absorption axis of the polarizer adjacent thereto and is substantially perpendicular to the orientation direction of liquid crystal molecules adjacent to said phase plate.

18. The liquid crystal display device in accordance with claim 1, wherein
said phase plate is optical uniaxially and an optical axis thereof has an angle from 70° to 110° with respect to the orientation direction of liquid crystal molecules adjacent to said phase plate and a polarization axis of the related polarizer has an angle from 30° to 60° with respect to the orientation direction of liquid crystal molecules adjacent to said polarizer.

19. The liquid crystal display device of claim 1, wherein liquid crystal molecules in said chiral nematic liquid layer are twisted at a twist angle within the range of 180° to 300°.

* * * * *

UNITED STATES PATENT AND TRADEMARK OFFICE
CERTIFICATE OF CORRECTION

PATENT NO. : 4,936,654

DATED : June 26, 1990

INVENTOR(S) : Takeshi Suzaki et al.

It is certified that error appears in the above-identified patent and that said Letters Patent is hereby corrected as shown below:

Claim 1, line 6 (column 9, line 17) replace "cyrstal" by --crystal--;

Claim 1, line 10 (column 9, line 21) replace "cyrstal" by --crystal--;

Claim 8, line 3 (column 9, line 65) replace "angel" by --angle--;

Claim 17, line 1 (column 10, line 47) replace "accordancde" by --accordance--.

Signed and Sealed this

Seventh Day of January, 1992

Attest:

HARRY F. MANBECK, JR.

*Attesting Officer*  *Commissioner of Patents and Trademarks*